United States Patent [19]

Iwamoto et al.

[11] 4,438,401
[45] Mar. 20, 1984

[54] SYSTEM FOR DETECTING A CABLE BURIED UNDER THE SEABED

[75] Inventors: Yoshinao Iwamoto, Fujumi; Shizuo Suzuki, Yokohama; Yuichi Shirasaki, Tokyo, all of Japan

[73] Assignee: Kokusai Denshin Denwa Co., Ltd., Tokyo, Japan

[21] Appl. No.: 168,402

[22] Filed: Jul. 10, 1980

[30] Foreign Application Priority Data

Jul. 31, 1979 [JP] Japan .................................. 54-98656

[51] Int. Cl.$^3$ ....................... G01V 3/08; G01V 3/165; G01V 3/38; G01B 7/14
[52] U.S. Cl. ..................................... 324/326; 324/247
[58] Field of Search ................. 324/67, 326, 345, 253, 324/207, 247

[56] References Cited

U.S. PATENT DOCUMENTS

| 2,427,666 | 9/1947 | Felch et al. | 324/253 X |
| 4,085,360 | 4/1978 | Howell | 324/326 |
| 4,130,791 | 12/1978 | Slough et al. | 324/326 |
| 4,220,913 | 9/1980 | Howell et al. | 324/326 X |
| 4,295,095 | 10/1981 | Thomas et al. | 324/326 |
| 4,309,659 | 1/1982 | Yoshii | 324/326 X |

FOREIGN PATENT DOCUMENTS

| 55-35204 | 3/1980 | Japan | 324/326 |
| 2006438 | 5/1979 | United Kingdom | 324/67 |
| 526838 | 10/1976 | U.S.S.R. | 324/326 |
| 569984 | 12/1977 | U.S.S.R. | 324/326 |
| 708277 | 1/1980 | U.S.S.R. | 324/67 |

OTHER PUBLICATIONS

Johnson, E. A., Marine Magnetometer Locates Submarine Cables, *Sea Technology*, (Compass Pub. Inc., Arlington, Va.), vol. 16, No. 9, pp. 21–22, Sept. 1975.

*Primary Examiner*—Gerard R. Strecker
*Attorney, Agent, or Firm*—Martin M. Novack

[57] ABSTRACT

A cable buried under a sea bottom is located by causing to flow in the cable an AC current, and measuring the magnetic flux near the cable. The present cable location system comprises (a) a vehicle for mounting a flux detector, (b) means for applying an alternating current in the cable to be detected, to produce magnetic flux around the cable, (c) a three dimensional flux detector having three detector elements, each having cosine sensitivity characteristics, mounted on said vehicle, the maximum sensitivity direction of each element being perpendicular to one another, and the maximum sensitivity direction of one of the detector elements being directed in the vertical direction, (d) means for separating the output signals of each of said detector elements into a DC component which is caused by the earth's magnetic field and an AC component which is caused by said alternating current, (e) means for determining the direction of the cable from the DC and AC output signals of two detector elements which have directivity in the horizontal plane, and (f) means for determining the horizontal distance and the vertical distance between the cable and the cable detecting system from the AC output signals of the detector elements based on the principle that the magnitude of the flux is inversely proportional to the distance to the cable and the direction of the flux is in the tangential direction of a circle having the center on its cable.

9 Claims, 16 Drawing Figures

SYSTEM FOR DETECTING A CABLE BURIED UNDER THE SEABED

BACKGROUND OF THE INVENTION

The present invention relates to a system for detecting a cable which is buried in a seabed, underground, or in a riverbed.

A communication cable, and/or a power transmission cable laid under the seabed and/or riverbed is in practice buried under the seabed and/or riverbed, in order to prevent damage to the cable by fishing nets and/or ship's anchors. When one intends to lift the buried cable on to the ship for the purpose of repairing the cable, the presence of the cable must be located. A prior tool for the location and the pick-up of a cable is a particularly shaped hook which has a structure which enables it to trench a seabed and to catch the cable. That hook is pulled by the ship so that the hook travels on the seabed in the perpendicular direction of the cable to be searched, and when the hook catches the cable, the hook is lifted on to the deck of the ship together with the cable.

However, said cable detection system has the disadvantage that the detected cable is often broken by the hook. Since the cable is fixed under the seabed, the cable would be broken by the hook unless the workship which pulls the hook stops immediately when the hook catches the cable. Accordingly, the workship must pull the hook very slowly in order not to break the cable. Therefore, it takes very long time to locate and/or pick-up a cable under the seabed.

SUMMARY OF THE INVENTION

It is an object of the present invention, therefore, to overcome the disadvantages and limitations of a prior cable detecting system by providing a new and improved cable detection system.

It is also an object of the present invention to provide a cable detection system which can detect easily a cable which is buried under the seabed.

The above and other objects are attained by a system for detecting a cable comprising; means for applying an alternating current in the cable to be detected to produce magnetic flux around the cable; a vehicle; a three dimensional flux detector having three detector elements, each having cosine sensitivity characteristics, mounted on said vehicle, the maximum sensitivity direction of each element being perpendicular to one another, and the maximum sensitivity direction of one of the detector elements being directed in the vertical direction; means for separating the output signals of each of said detector elements into a DC component which is caused by the earth's magnetic field and AC component which is caused by said alternating current; means for determining the direction of the cable from the DC and AC output signals of two detector elements which have directivity in the horizontal plane; and means for determining the horizontal distance and the vertical distance between the cable and the cable detection system from the AC output signals of the detector elements based on the principle that the magnitude of the flux is inversely proportional to the length to the cable and the direction of the flux is in the tangential direction of a circle having its center on the cable.

BRIEF DESCRIPTION OF THE DRAWINGS

The foregoing and other objects of the present invention will be better understood by means of the following description and the accompanying drawings wherein;

FIG. 5 is a block diagram of the receiver 32 in FIG. 1, FIG. 6, FIG. 7 and FIG. 8 are modifications of a flux sensor with three axes, one of which is vertical.

DESCRIPTION OF THE PREFERRED EMBODIMENT

Figure 1:
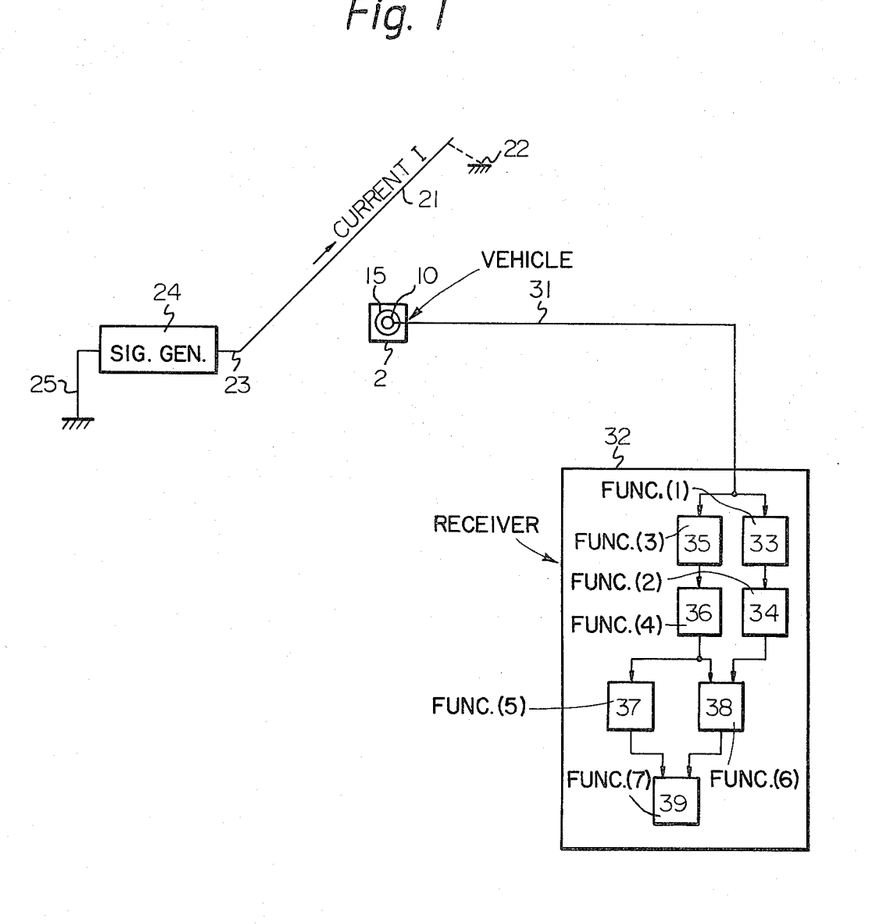
FIG. 1 shows the general configuration of the cable detection system according to the present invention.

FIG. 1 shows the general configuration of the cable detection system according to the present invention. In order to explain the operation of FIG. 1, the three dimensional flux detector according to the present invention is described in accordance with FIGS. 2(A), 2(B) and 3.

Figure 2A:
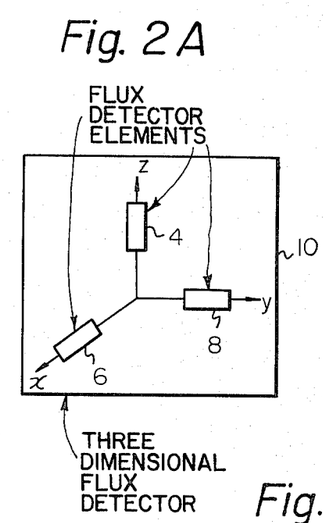
FIG. 2(A) shows an example of the flux sensor having the three perpendicular axes.

FIG. 2(A) shows the three dimensional flux detector 10, which has flux detector elements 4, 6 and 8, each of which has a cosine directivity characteristic of flux detection. It is assumed that sensitivity of each flux detector element is the same. The flux detector elements are positioned so that the directions of the maximum sensitivity of the each of the flux detector elements are perpendicular to one another.

Figure 2B:
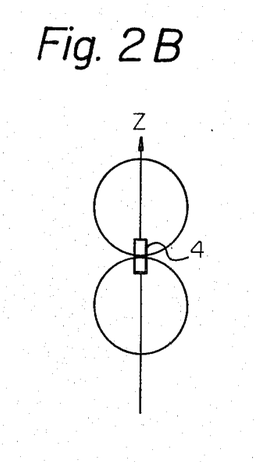
FIG. 2(B) shows an example of the flux sensor having three perpendicular axes, one of which is positioned vertically.

When the first flux detector element 4 is positioned so that the maximum sensitivity of the detector element 4 is in the z-direction in the (x,y,z) coordinates space, the characteristics of the detector element 4 have the cosine characteristics in all the planes including the z-axis as shown in FIG. 2(B). Similarly, the other flux detector elements 6 and 8 have the maximum sensitivity in the x-direction and y-direction, respectively, with the cosine characteristics. Those detector elements 4, 6 and 8 which compose the flux detector 10, detect the flux according to each directivity and each sensitivity, and provide the corresponding electrical output signals. Each of those detectors having said cosine characteristics can be implemented by a flux-gate detector, or a thin film double frequency type flux detector. The latter is shown in U.S. Pat. No. 3,854,086. An example of a flux gate detector is RAM-53C type detector manufactured by Schonstedt Inc. in U.S.A.

When a detector element has cosine directivity characteristics, the output electrical signal is proportional to $\cos \theta$, where $\theta$ is the angle between the direction in which the detector element has the maximum sensitivity and the direction of the flux to be detected.

Figure 3:
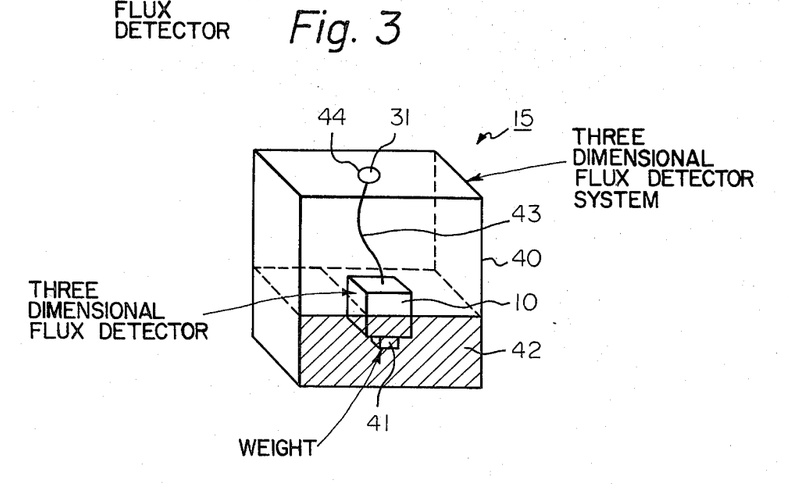
FIG. 3 shows an enbodiment of the structure of the flux sensor having three axes, one of which is vertical, FIG. 4(A), FIG. 4(B), FIG. 4(C) and FIG. 4(D) aid in explanation of the operational principle of the present cable detection system.

FIG. 3 shows the structure of the three dimensional flux detector, in which one of the elements is directed vertically (in the z-direction). It should be appreciated of course that when the first detector element is directed vertically, the other two detector elements which are perpendicular to that first element have the maximum sensitivity in the horizontal plane. In FIG. 3, the reference numeral 10 is a three dimensional flux detector, 15 is a three dimensional flux detector system with one axis directed vertically, 40 is a housing of the detector 15, 41 is a weight or a bob attached at the bottom of the three dimensional flux detector 10, 42 is liquid having the high viscosity like fluid paraffin, and 43 is a light flexible lead line for connecting the electrical output of the detector to an external circuit. Also, 44 is a coupler for connecting the lead line 43 to an external signal line 31.

The operation of the apparatus of FIG. 3 is as follows. The liquid 42 provides the buoyancy to the detector 10, and so, the detector 10 floats on the surface of the liquid 42 with the weight 41 directed downwards. In this structure, if the first detector element 4 is fixed to the housing 40 so that the maximum sensitivity is directed vertically, the other two detector elements have the maximum sensitivity in the horizontal plane. And the three detector elements 4, 6 and 8 sense the flux at the place that the detector 15 is positioned, and provide an output electrical signal through the lead line 43, the coupler 44 and the signal line 31.

Now, the cable detection system according to the present invention is described in accordance with FIG. 1. The three dimensional flux sensor 15 having the vertical axis is mounted on the vehicle 2 which can move on the seabed according to the remote control by the workship. It is assumed that there is something wrong with the cable 21 buried under the seabed, and cable 21 is grounded at the point 22. Then, the alternating current supplied by the signal generator 24 through the cable terminal 23 is applied to the cable 21, and the return path of that alternating current is provided between the ground at the point 22 of the cable 21 and the earth point 25 of the signal generator 24. The signal thus provided in the cable 21 induces magnetic flux around the cable 21. According to the theory of electromagnetics, the strength of the magnetic flux is proportional to the electric current of the signal, and is inversely proportional to the distance from the cable 21. Also, the direction of the magnetic flux is the direction of the tangential line on a circle, the center of which is on the cable 21.

When the vehicle 2 comes near the cable 21 which generates that magnetic flux, the detector elements 4, 6 and 8 of the three dimensional flux detector 15 on the vehicle 15 detect both the magnetic flux resulting from the earth's magnetism, and the magnetic flux induced by said alternating current, according to the directivity of each flux sensor element. In this case, it should be appreciated that the earth's magnetic field is always constant, while the magnetic flux induced by the alternating current is the alternating flux, the strength of which changes rapidly. Accordingly, the earth's magnetic field and the alternating magnetic flux can be separated by using a separation filter.

The outputs of the detector elements 4, 6 and 8 of the three dimensional flux detector 15 are transmitted to the receiver 32 on the workship through the signal line 31. The receiver 32 has the following seven functions.

(1) To measure the earth's magnetic field from the outputs of the detector elements 4, 6 and 8.

(2) To calculate the angle between the magnetic north and the direction of the directivity of the detector elements 6 and 8 which are positioned in the horizontal plane. The magnetic north is obtained by the output of the step (1). The directivity direction of a detector element is the direction that the sensitivity is maximum in the sensor.

(3) To measure the flux which is generated by the alternating current applied to the cable 21, in each of the detector elements 4, 6 and 8.

(4) To calculate the strength and the direction of the magnetic flux generated by the alternating current at the position that the three dimensional flux sensor 15 is located.

(5) To calculate the position information of a cable (the linear distance, the horizontal distance and the vertical distance between the vehicle 2 and the cable) according to the result of the step (4).

(6) To calculate the direction of the cable with respect to the vehicle 2 according to the results of the step (2) and the step (4).

(7) To display the position information of the cable with respect to the vehicle 2 according to the results of the step 5 and the step 6. In the receiver 32 in FIG. 1, the block 33 relates to the function (1), the block 34 relates to the function (2), the block 35 relates to the function (3), the block 36 relates to the function (4), the block 37 relates to the function (5), the block 38 relates to the function (6), and the block 39 relates to the function (7). Each function (1 through 7) can be implemented by a single piece of hardware equipment, instead of the plurality of separate hardwares as shown in FIG. 1.

The element sensors 4, 6 and 8 of the three dimensional flux sensor 15 provide the superposed flux of the earth magnetic field and the flux generated by the alternating current in the cable 21, and the outputs of each element sensors 4, 6 and 8 are applied to the receiver 32 through the signal line 31. In the receiver 32, the block 33 derives the earth's magnetic field component from the outputs of the element sensors 4, 6 and 8, and the block 34 calculates the angle between the magnetic north and the direction of the directivity of the sensors 6 and 8 which are positioned in the horizontal plane. The calculation in the block 34 will be described later. The block 35 derives the electrical signal related to the flux generated by the alternating current in the cable 21, and measured by each of the element sensors 4, 6 and 8, and the block 36 calculates the strength and the direction of the flux according to the output of the block 35. The block 37 provides the position information of the cable 21 according to the output of the block 36. That position information includes the linear distance, the horizontal distance and the vertical distance between the cable 21 and the vehicle 2. However, the output of the block 37 provides only the information that the cable 21 is located by the known distance from the vehicle 2, but that block 37 does not provide the direction of the cable 21, so the position of the cable 21 is not completely determined by the block 37. Therefore, the block 38 provides the direction of the cable 21 according to the outputs of the block 34 and the block 36. And the block 39 displays the position of the cable 21 (the direction of the cable 21 with respect of the vehicle 2, the linear distance, the horizontal distance and the vertical distance between the cable 21 and the vehicle 2) according to the outputs of the block 37 and the block 38. The display is performed on a braun tube.

According to the present invention, the position of the cable is readily located. When the present apparatus is combined with a cable lifting machine, a cable can be lifted on a workship without breaking the detected cable, since the position of the cable is accurately located by the present invention. Also, when the present apparatus is combined with a cable burying machine, the cable burying machine can accurately trace the cable.

Figure 4A:
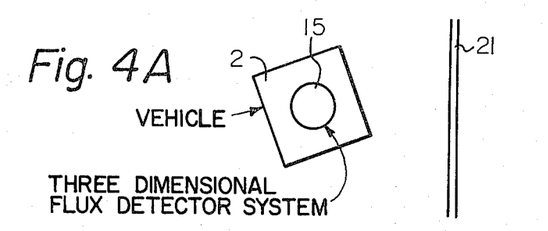
Figures 4B, 4C, 4D:
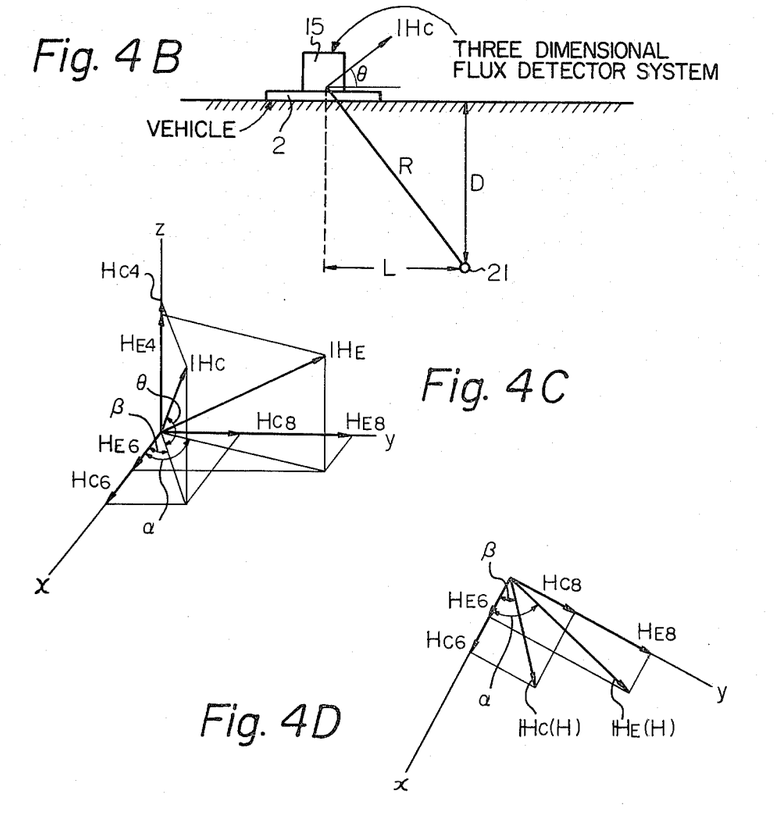

FIGS. 4(A) through 4(D) show the location of a cable in detail, and FIG. 4(A) is a plane view, FIG. 4(B) is a side view from the axis direction of the cable 21, FIG. 4(C) shows the flux vector (earth magnetic field and the flux by the alternating current), and FIG. 4(D) shows the relationship between the horizontal component of the earth magnetic field and the element sensors 6 and 8.

It is assumed that the vehicle 2 having the three dimensional flux detector 15 moves on the surface of the seabottom by being pulled by the workship, the linear distance between the flux detector 15 and the cable 21 is R, the horizontal distance between them is L, and the vertical distance between them is D as shown in FIG. 4(B). It should be noted that the vertical length D is substantially the same as the depth of the buried cable. Also, it is assumed that the vector of the magnetic flux generated by the alternating current in the cable is $H_c$ and the absolute value of the same is $|H_c|$, the angle between that vector $H_c$ and the horizontal plane is $\theta$, and the magnetic fluxes detected by the detector elements 4, 6 and 8 with respect to the alternating current are $H_{c4}$, $H_{c6}$ and $H_{c8}$. Also, the vector of the earth's magnetic field is $H_E$, the absolute value of the same is $|H_E|$, and the angle between the horizontal component of the earth's magnetic field and the maximum sensitivity direction of the detector element 6 is $\alpha$. Also, the strengths of the earth's magnetic field detected by the detector elements 4, 6 and 8 are $H_{E4}$, $H_{E6}$ and $H_{E8}$.

It should be appreciated that the first detector element 4 detects the vertical component of the magnetic flux at the location that the vehicle 2 is positioned irrespective of the vibration, the pitching and/or the rolling of the vehicle 2. Also, the second and the third detector elements 6 and 8 detect the horizontal components of the magnetic flux.

When the vehicle 2 is positioned far from the cable 21, the detector elements 4, 6 and 8 of the three dimensional flux detector 15 detect only the earth's magnetic field. When the vehicle 2 is positioned near the cable 21, each detector element 4, 6 and 8 detects both the earth's magnetic field, and the magnetic flux generated by the alternating current in the cable 21.

When the cable 2 is near the cable 21, the magnetic fluxes $H_4$, $H_6$, $H_8$ detected by the elements 4, 6 and 8 are expressed as follows.

$$H_4 = H_{c4} + H_{E4}$$
$$H_6 = H_{c6} + H_{E6} \quad (1)$$
$$H_8 = H_{c8} + H_{E8}$$

where the first term of the right side shows the alternating magnetic flux generated by the alternating current in the cable 21, and the second term of the right side shows the earth's magnetic field, which is constant.

The outputs of each detector elements 4, 6 and 8 are separated into the alternating current component and the earth's field component by utilizing a filter as mentioned with respect to the receiver 32 in FIG. 1. Accordingly, the following formulae are satisfied with respect to the earth's field component taking into consideration the relation of FIG. 4(D).

$$\tan\alpha = \frac{H_{E8}}{H_{E6}} \quad (2)$$

Accordingly, $$\alpha = \tan^{-1}\frac{H_{E8}}{H_{E6}} \quad (2)'$$

In FIG. 4(D), $H_c(H)$ and $H_E(H)$ are the horizontal components of $H_c$ and $H_E$, respectively. In the above formulae (2) and (2)', the angle $\alpha$ between the magnetic north and the maximum sensitivity direction of the detector element 6 is obtained by the arc-tangent of the ratio of $H_{E8}$ to $H_{E6}$, where $H_{E6}$ and $H_{E8}$ are DC components of the outputs of the detector elements 6 and 8.

On the other hand, the alternating magnetic flux generated by the alternating current in the cable 21 depends upon the strength of that alternating current in the cable 21, and the positional relationship between the vehicle 2 and the cable 21. And the following relations are satisfied by deriving the alternating components $H_{c4}$, $H_{c6}$ and $H_{c8}$ from the outputs of the detector elements 4, 6 and 8;

$$\left.\begin{array}{l} R = a\dfrac{I}{|H_c|} \\[6pt] \theta = \sin^{-1}\dfrac{H_{c4}}{|H_c|} \\[6pt] |H_c| = \sqrt{H_{c4}^2 + H_{c6}^2 + H_{c8}^2} \end{array}\right\} \quad (3)$$

where (a) is a constant, I is the strength of the alternating current supplied in the cable 21.

Also, the angle $\beta$ between the horizontal component of the alternating magnetic flux and the maximum sensitivity direction of the detector element 6 can be expressed by the following relationship.

$$\tan\beta = \frac{H_{c8}}{H_{c6}} \quad (4)$$

$$\beta = \tan^{-1}\frac{H_{c8}}{H_{c6}} \quad (4)'$$

Also, the angle $\gamma$ between the magnetic north and the horizontal component of the alternating magnetic flux is expressed as follows (see FIG. 4(D)).

$$\gamma = \alpha - \beta \quad (5)$$

That is to say, the cable 21 locates in the direction indicated by the formula (5).

On the other hand, it is apparent from FIG. 4(B) that the horizontal distance L and the vertical distance D are as shown below.

$$\left.\begin{array}{l} L = R\,|\sin\theta| \\[4pt] D = R\,|\cos\theta| \end{array}\right\} \quad (6)$$

From the formula (3) and (6), the following relationships are derived.

$$L = a \frac{I}{|H_c|} \left| \sin\left(\sin^{-1} \frac{H_{c4}}{|H_c|}\right) \right|$$
$$D = a \frac{I}{|H_c|} \left| \cos\left(\sin^{-1} \frac{H_{c4}}{|H_c|}\right) \right|$$ (7)

Also, the direction of the cable 21 from the three dimensional flux detector 15 (the angle from the magnetic north) is expressed in the formula (8) which is derived from the formulae (2)', (4)' and (5).

$$\gamma = \tan^{-1} \frac{H_{E8}}{H_{E6}} - \tan^{-1} \frac{H_{c8}}{H_{c6}}$$ (8)

As described above, the three dimensional flux detector 15 having the detector elements 4, 6 and 8, each having cosine characteristics, is mounted on the vehicle 2 so that the maximum sensitivity direction of each of the elements are perpendicular to one another, one of the detector elements (detector element 4) being directed vertically, detects both the earth's magnetic field and the alternating magnetic flux generated by the alternating current in the cable 21 for the purpose of the location of the cable 21. The detected outputs of the elements 4, 6 and 8 are applied to the receiver 32, in which the earth's magnetic field is separated from the alternating magnetic flux, based upon the principle that the earth's magnetic field is constant, while the magnetic flux generated by the alternating current is alternating. Then, next, the angle $\alpha$ between the magnetic north and the maximum sensitivity direction of the element 6 is obtained according to the formula (2)', then, the linear distance R and the angle $\theta$ between the horizontal plane and the alternating magnetic flux are obtained according to the formula (3), and finally, the horizontal distance and the vertical distance between the cable 21 and the vehicle 2 are obtained according to the formula (7). Further, the angle $\beta$ between the horizontal component of the alternating flux and the maximum sensitivity direction of the element 6 is obtained by the formula (4)', and the angle $\gamma$ of the cable 21 from the vehicle 21 (the angle from the magnetic north) is obtained from said angles $\alpha$ and $\beta$ according to the formula (8). From the above operation, the cable 21 is completely located, and the linear distance, the horizontal distance and the vertical distance between the vehicle 2 and the cable 21, and the direction of the cable 21 from the vehicle 2 are obtained at the same time.

Further, it should be appreciated that cable tracking to move the vehicle 2 just on the cable 21 by controlling the vehicle 2 so that the value L is zero, can be carried out. In this case, since the angle $\gamma$ between the vehicle and the cable can be measured, the moving direction of the vehicle 2 can be forecasted. Therefore, extremely accurate tracking can be carried out.

Figure 5:
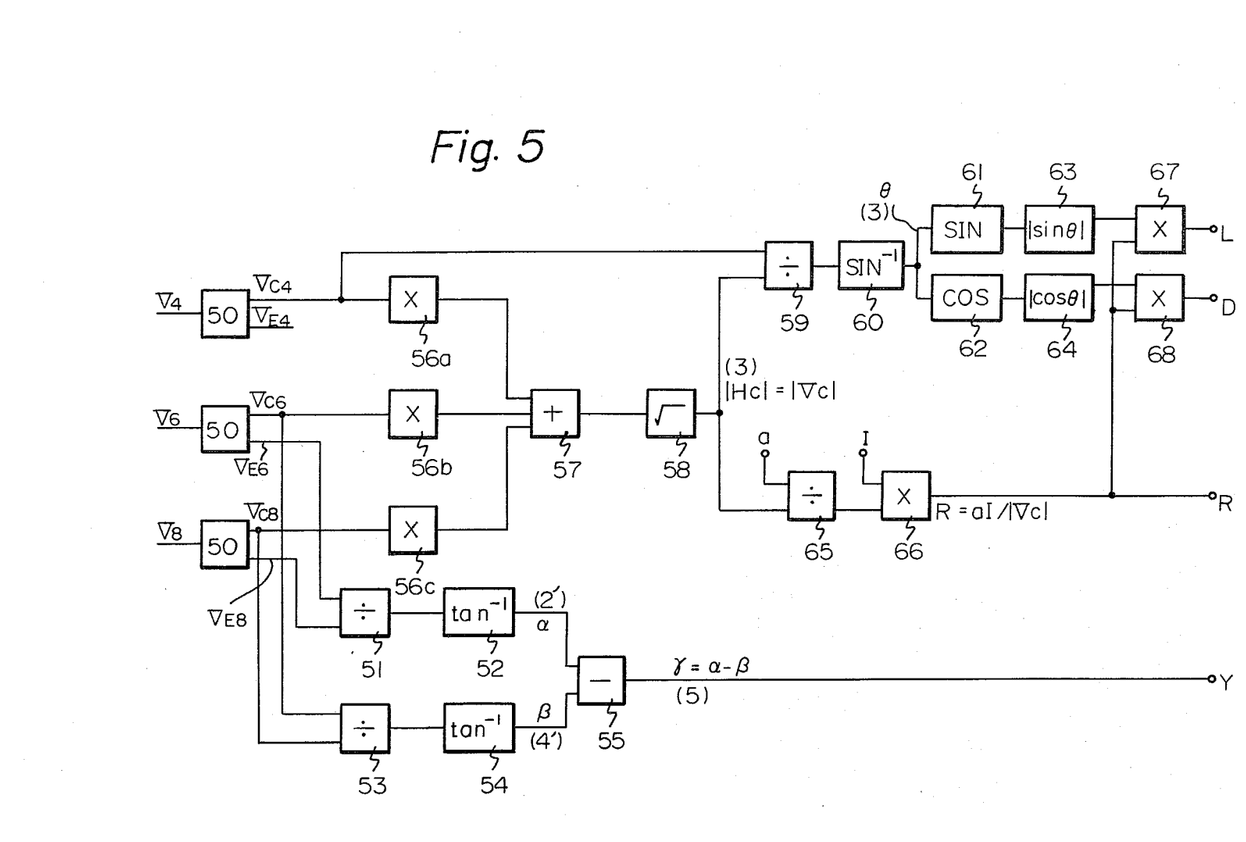

FIG. 5 is a block diagram of the main portion of the receiver 32, in which the output signals $V_4$, $V_6$ and $V_8$ of the detector elements 4, 6 and 8 are separated into the DC component (corresponding to the earth magnetic field), and the AC component (corresponding to the alternating location signal), respectively, and the calculation based upon the formulae (2)', (3), (4)', (6), (7) and (8). In FIG. 5, the separation filter 50, which is a low pass filter, separates the DC component and the AC component in the output signals $V_4$, $V_6$ and $V_8$. The former corresponds to the earth magnetic field, and the latter corresponds to the alternating location current in the cable 21. Among the outputs of the separation filters 50, the signals $V_{c4}$, $V_{c6}$ and $V_{c8}$ are AC components in the output signals of the detector elements 4, 6 and 8, and $V_{E4}$, $V_{E6}$ and $V_{E8}$ are DC components in the output signals of the detector elements 4, 6 and 8. The signals $V_{E6}$ and $V_{E8}$ are applied to the divider circuit 51, which provides the quotient $V_{E8}/V_{E6}$. That quotient of the output of the divider circuit 51 is applied to the arc-tangent circuit 52, which provides the output signal indicating the angle $\alpha$ between the magnetic north and the maximum sensitivity direction of the detector element 6 according to said formula (2)'. Among the outputs of the separation filters 50, the signals $V_{c6}$ and $V_{c8}$ are applied to the divider circuit 53, which provides the quotient $V_{c8}/V_{c6}$. That quotient is applied to the arc-tangent circuit 54, which provides the output signal indicating the angle $\beta$ between the horizontal component of the alternate location flux and the maximum sensitivity direction of the detector element 6 according to said formula (4)'. The outputs ($\alpha$ and $\beta$) of the circuits 52 and 54 are applied to the subtractor 55, which provides the difference ($\alpha - \beta$) indicating the angle between the magnetic north and the horizontal component of the alternating location flux.

On the other hand, the signals $V_{c4}$, $V_{c6}$ and $V_{c8}$ are applied to the square circuits 56a, 56b and 56c, respectively, which provide $(V_{c4})^2$, $(V_{c6})^2$ and $(V_{c8})^2$, respectively. The squared values are added to one another in the adder 57, the output of which is applied to the square root circuit 58. Then, the circuit 58 provides the output voltage $|V_c|$ corresponding to the absolute value $|H_c|$ of the magnetic flux shown in the formula (3). Further, the signal $V_{c4}$ and the output voltage $|V_c|$ of the square root circuit 58 are applied to the divider circuit 59, the output of which is applied to the arc-sine circuit 60. The arc-sine circuit 60 provides the angle $\theta$ between the horizontal plane and the alternating location flux as shown in the formula (3). The value $\theta$ of the output of the circuit 60 is applied to the sine circuit 61 and the cosine circuit 62, which provide $\sin\theta$ and $\cos\theta$, respectively. Those values $\sin\theta$ and $\cos\theta$ are applied to the absolute circuits 63 and 64, respectively, which provide $|\sin\theta|$ and $|\cos\theta|$, respectively.

The output of the square root circuit 58 is further applied to the divider circuit 65, which divides the predetermined constant (a) by the input signal $|V_c|$ and provides the quotient $a/|V_c|$, which is applied to the multiplicator 66. The multiplicator 66 provides the product of the output signal of said divider circuit 65 and the predetermined constant (I), thus, the product of the multiplicator 66 is $R = aI/|V_c|$. That output R of the multiplicator 66 indicates the linear distance R between the vehicle 2 and the cable 21. Further, the multiplicator 67 provides the product of the output signal $|\sin\theta|$ of the absolute circuit 63 and the output signal $aI/|V_c|$, and said product indicates the horizontal distance L between the vehicle 2 and the cable 21. Also, the other multiplicator 68 provides the product of the output signal $|\cos\theta|$ of the output of the absolute circuit 64 and the output signal $aI/|V_c|$ of the multiplicator 66, and said product indicates the vertical distance D or the depth between the vehicle or the surface of the seabottom and the cable 21.

As described above in detail, according to the present invention, the output signals $V_4$, $V_6$ and $V_8$ (or the DC components $V_{E4}$, $V_{E6}$ and $V_{E8}$, and the AC components $V_{c4}$, $V_{c6}$ and $V_{c8}$ of the same, respectively) of the three dimensional flux detector 15 are calculated by electronic circuits, and the position of the cable (the linear distance R, the horizontal distance L and the vertical distance D between the vehicle 2 and the cable 21), and the direction $\gamma$ of the cable (the angle between the magnetic north and the cable 21 in the view from the vehicle 2) are obtained at the same time.

Figure 6:
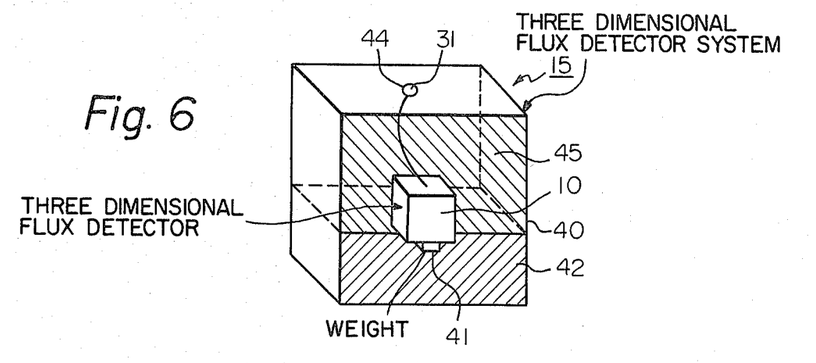
Figure 7:
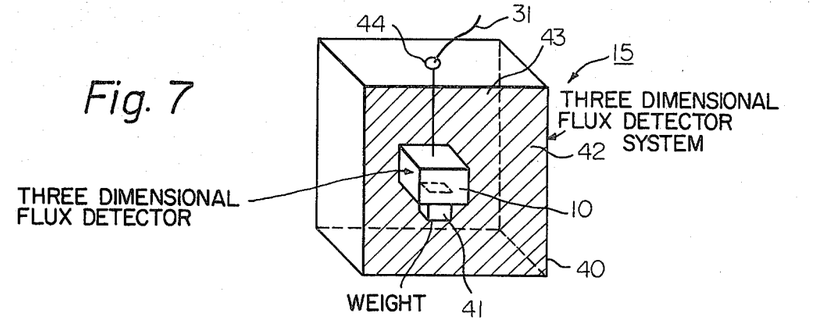
Figure 8:
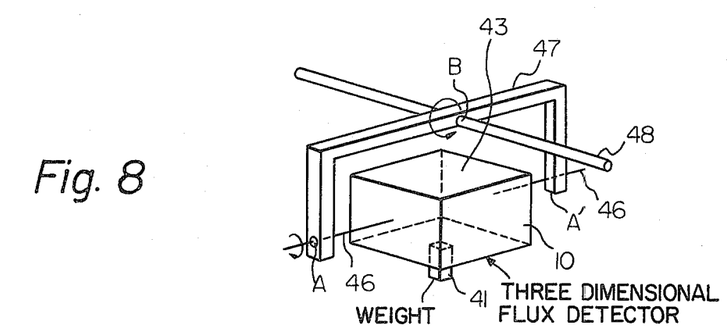

Now, some alternatives of a three dimensional flux detector are described in accordance with FIGS. 6, 7 and 8.

FIG. 6 is the first alternative of a three dimensional flux detector, in which the flux detector 10 is completely sunk or surrounded in the liquid, while the flux detector 10 in FIG. 3 floats on the liquid. The same reference numerals of FIG. 6 as those of FIG. 3 indicate the same members as those of FIG. 3. In FIG. 6, the liquid comprises the first liquid 45, and the second liquid 42, which has the specific gravity larger than that of the liquid 45. The weight of the flux detector 10 and the weight 41 is balanced with the buoyancy by the liquids 42 and 45, and the flux detector 10 floats in the liquids. Thus, the weight 41 is directed vertically, and the detector element 4 is also directed in the vertical direction. The embodiment of FIG. 6 has the advantage that an external irregular vibration does not greatly change the posture of the flux detector, since the flux detector is completely sunk in the liquids.

FIG. 7 shows the second alternative of the three dimensional flux detector, in which the same reference numerals as those of FIGS. 3 and 6 show the same members as those in those figures. The feature of the embodiment of FIG. 7 resides in that the total weight of the flux detector 10 and the weight 41 is larger than the buoyancy by the liquid 42. Therefore, although the liquid 42 is composed of a single liquid, it has substantially the same effect as that of FIG. 6.

Some examples of the liquid in FIGS. 6 and 7 are 42-glycerine, and 45-paraffin oil.

FIG. 8 is another alternative of the three dimensional flux detector, in which the same reference numerals as those of FIGS. 3, 6 and 7 show the same members as those in the figures. In FIG. 8, a shaft 46 is rigidly fixed to the flux detector 10, and said shaft 46 is rotatably supported by the pair of bearings A and A' on the U-shaped arm 47. Further, the center of the arm 47 is rotatably supported by the bearing B of the fixed linear arm 48, which is rigidly fixed to the wall (not shown) of the housing 40. In the structure of FIG. 8, it should be appreciated that the weight 41 directs the detector element 4 in the vertical direction. As the modification of FIG. 8, all the structure of FIG. 8 may be completely sunk in the liquid which has preferably high viscosity.

Now, some applications of the flux detector according to the present invention will be described in accordance with FIGS. 9, 10, 11 and 12.

Figure 9:
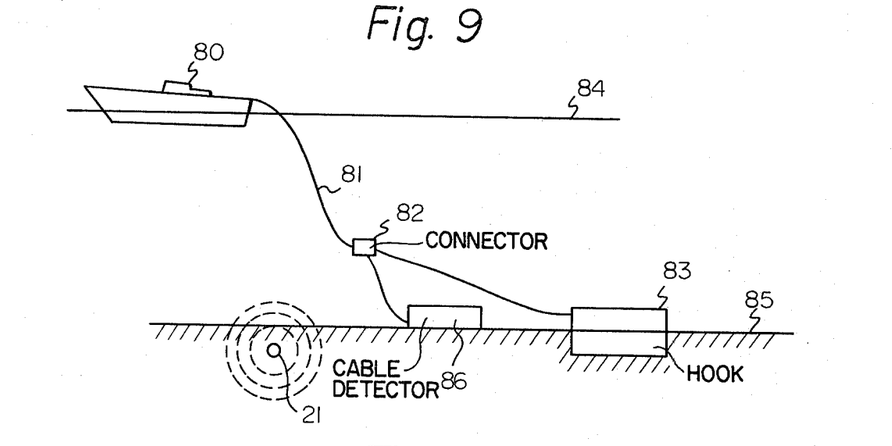
FIG. 9, FIG. 10, FIG. 11 and FIG. 12 show some applications of the present cable detection system.

FIG. 9 shows the case where the flux detector is pulled by a workship for detecting the presence of a buried cable. In FIG. 9, the reference numeral 80 is a workship, 81 is a pulling wire which has also a signal wire inside of the same, 82 is a connector for coupling the pulling wire connected to the hook 83 for lifting the cable and the signal wire connected to the cable detector 86, 21 is a cable to be detected, 84 is the seasurface, and 85 is the surface of the seabottom. The cable detector 86 is the three dimensional flux detector having the vertical component as described in accordance with FIGS. 3 through 6. The cable detector 86 is pulled by the workship 80 together with the hook 83, and detects the presence of the cable by sensing the magnetic flux (dotted line in FIG. 9) generated around the cable by the alternating current flowing in the cable from the terminal station (not shown). The output signal of the cable detector 86 is transmitted to the workship 80 through the signal wire in the pulling wire 81. Then, the workship 80 can recognize the presence of the cable by processing the signal from the cable detector 86 before the hook 83 reaches the cable. Therefore, when the presence of the cable is detected by the cable detector 86, the workship adjusts the pulling speed of the hook slowly so that the cable is lifted on to the workship without breaking the cable.

Figure 10:
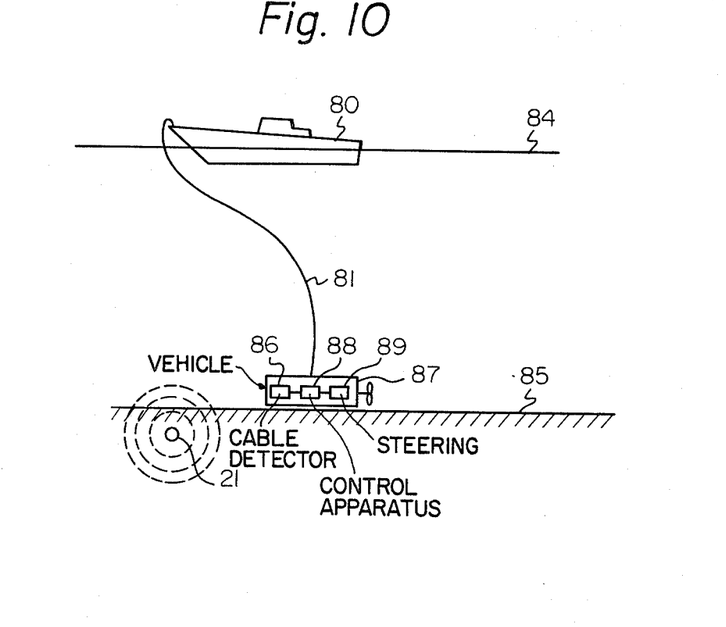

FIG. 10 shows the case where the flux detector is mounted on a vehicle which can move on the seabottom. The same reference numerals in FIG. 10 as those in FIG. 9 show the same members as those in FIG. 9. Also, the reference numeral 87 is a vehicle which can move automatically, 88 is a control apparatus for cable tracking, and 89 is a steering means of a vehicle.

As the case of FIG. 9, the cable detector 86 detects the presence of the cable by sensing the magnetic flux generated by the alternating current flown in the cable from the terminal station. The output signal of the cable detector 86 is processed, and according to the result of that process, the horizontal distance between the cable and the vehicle is controlled so as to be zero by the control apparatus 88. Thus, the vehicle 87 can move just above the cable.

Figure 11:
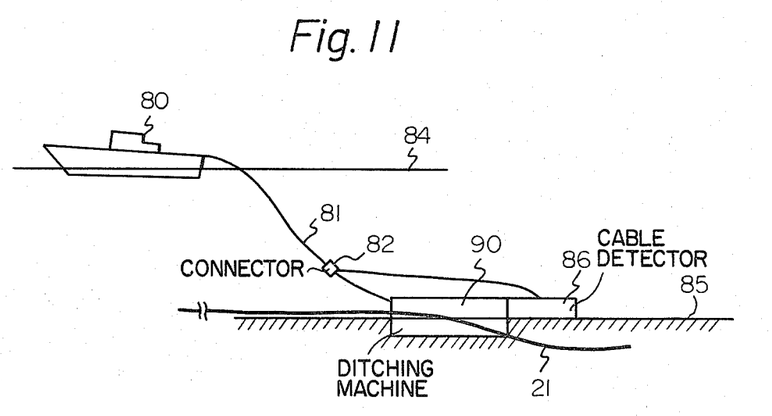

FIG. 11 is the case where the depth of the buried cable is measured when the cable is laid or buried in the seabottom. In FIG. 11, the same reference numerals as those in FIG. 9 show the same members as those in FIG. 9, and the reference numeral 90 is a ditching machine for ditching a trench on the seabottom and putting a cable on the bottom of the trench. The cable detector 86 is either mounted on the ditching machine 90, or pulled separately by the workship. In this embodiment, the depth of the buried cable is measured by the cable detector 86, and that depth is displayed in the workship 80.

Figure 12:
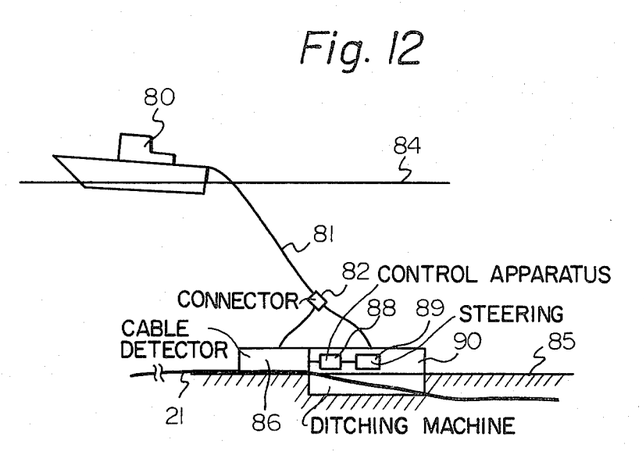

FIG. 12 is the case where the ditching machine is positioned just above the cable when the cable is laid or buried on the seabottom. The same reference numerals as those in FIG. 9 show the same members as those in FIG. 9. In order to catch the cable 21 by utilizing the ditching machine 90, the machine 90 must be positioned accurately just above the cable by sensing the location of the cable 21. Accordingly, the cable detector 86 is mounted in front of the ditching machine 90. As the case of FIG. 10, the position of the cable 21 is sensed by the cable detector 86, and the output signal of the detector 86 is processed. According to the result of that process, the control apparatus 88 steers the vehicle to control the ditching machine.

In the above description, the detector element 4, 6 or 8 can be any conventional flux sensor so long as the directivity of cosine characteristics is obtained.

It should be appreciated of course that the present invention is applicable to cases where a cable is laid not only on the seabottom, but also on land, on the bottom of a river, or even in a building.

From the foregoing, it will now be apparent that a new and improved cable detecting system has been set forth. It should be understood of course that the embodiments disclosed are merely illustrative and are not intended to limit the scope of the invention. Reference should be made, therefore, to the appended claims rather than the specification as indicating the scope of the invention.

What is claimed is:
1. A system for detecting a cable comprising;
    (a) means for applying an alternating current in the cable to be detected so as to produce magnetic flux around the cable,
    (b) a vehicle
    (c) a three dimensional flux detector having three detector elements each having cosine sensitivity characteristics mounted on said vehicle, the maximum sensitivity direction of each element being perpendicular to one another, and the maximum sensitivity direction of one of the detector elements being directed in the vertical direction,
    (d) means for separating the output signals of each of said detector elements into a DC component which is caused by the earth's magnetic field and an AC component which is caused by said alternating current,
    (e) means for determining the direction of the cable from the DC and AC output components of two detector elements which have their directivity in the horizontal plane,
    (f) means for determining the horizontal distance and the vertical distance between the cable and the cable detecting system from the AC output signals of each of the detector elements on the principle that the magnitude of the flux is inversely proportional to the distance to the cable and the direction of the flux is in the tangential direction of the circle having the center on the cable.

2. A system for detecting a cable according to claim 1, wherein said three dimensional flux detector further comprises a weight fixed to the detector elements, and means for directing said weight in the vertical direction so as to direct the maximum sensitivity direction of one of the detector elements in the vertical direction.

3. A system for detecting a cable according to claim 2, wherein said three dimensional flux detector further comprises a housing containing liquid, and said detector elements together with the weight are floated on the surface of said liquid.

4. A system for detecting a cable according to claim 2, wherein said means for directing said weight comprises a shaft (46) rigidly fixed to the detector elements, a U-shaped arm (47) rotatably mounting said shaft (46) at the extreme ends of the arm (47), and a linear fixed arm (48) rotatably supporting the center of said U-shaped arm (47).

5. A system for detecting a cable according to claim 1, wherein said means for determining the direction of the cable comprises a first divider (51) for providing $V_{E8}/V_{E6}$, a second divider (53) for providing $V_{c8}/V_{c6}$, a pair of arc-tangent circuits (52, 54) for providing the arc-tangent values of said two values, and a subtractor (55) for providing the difference between the two outputs of said arc-tangent circuits as the direction ($\gamma$) of the cable; and said means for determining the horizontal distance and the vertical distance comprises means for providing the absolute value $|V_c|$ of the alternating flux by combining the outputs of three detector elements, a divider (59) for providing $V_{c4}/|V_c|$, means (60, 61, 62, 63, 64) for providing sin (sin$^{-1}$ $V_{c4}/|V_c|$), and cos(-sin$^{-1}$ $V_{c4}/|V_c|$), means (65, 66) for providing R=aI/$|V_c|$, and a pair of multiplicators (67, 68) for providing the product of said R and the outputs of said means (60, 61, 62, 63 and 64) for providing the horizontal distance (L) and the vertical distance (D) to the cable, where $V_{E6}$ and $V_{E8}$ are DC components of the detector elements directed in the horizontal plane, $V_{c6}$ and $V_{c8}$ are AC components of the detector elements directed in the horizontal plane, $V_{c4}$ is the AC component of the detector element directed in the vertical direction, $|V_c|$ is equal to $\sqrt{V_{c4}^2+V_{c6}^2+V_{c8}^2}$, (a) is constant, and (I) is another constant.

6. A system for detecting a cable comprising:
    means for applying an alternating current in the cable to be detected so as to produce magnetic flux around the cable;
    a three dimensional flux detector having three detector elements with mutually orthogonal sensitivity characteristics;
    means for directing the sensitivity of one of said detector elements in the vertical direction so that the other two detector elements have their maximum sensitivity directions in the horizontal plane;
    means for separating the output signals of said detector elements into a DC component which is caused by the earth's magnetic field and an AC component which is caused by said alternating current;
    means for determining the direction of the cable as a function of the DC and AC components of the detector elements having their maximum sensitivity directions in the horizontal plane; and
    means for determining the horizontal distance and the vertical distance between the cable and the cable detecting system as a function of the AC output components of each of the detector elements.

7. A system for detecting a cable according to claim 6, wherein said three dimensional flux detector further comprises a weight fixed to the detector elements, and means for directing said weight in the vertical direction so as to direct the maximum sensitivity direction of said one of the detector elements in the vertical direction.

8. A system for detecting a cable according to claim 7, wherein said three dimensional flux detector further comprises a housing containing liquid, and wherein said detector elements together with said weight are floated on the surface of said liquid.

9. A system for detecting a cable according to claim 7 wherein said means for directing said weight comprises a shaft rigidly fixed to the detector elements, a U-shaped arm rotatably mounting said shaft at the extreme ends of the arm, and a linear fixed arm rotatably supporting the center of said U-shaped arm.

* * * * *